Jan. 12, 1937.  O. SCHAPER  2,067,685
SERIES CLUTCH MECHANISM FOR MOTOR VEHICLES
Filed April 27, 1934
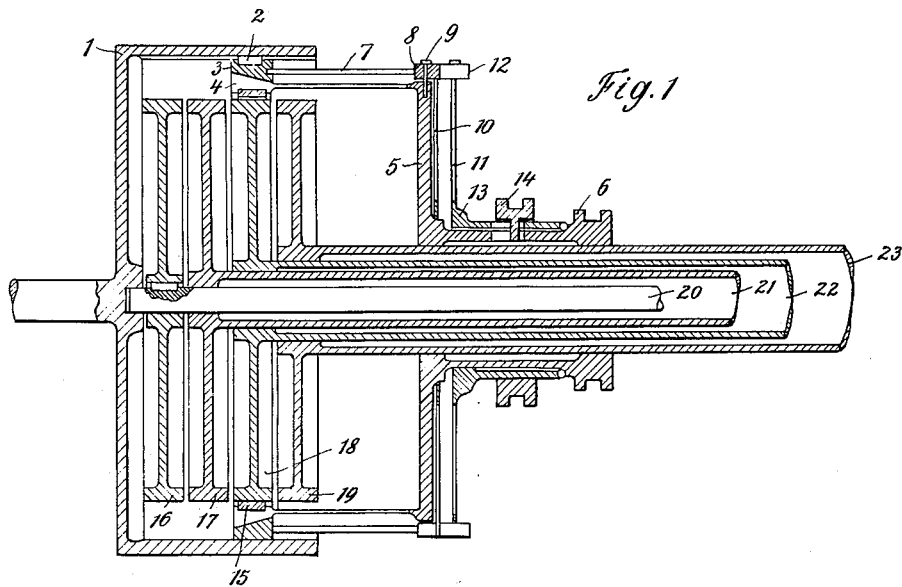
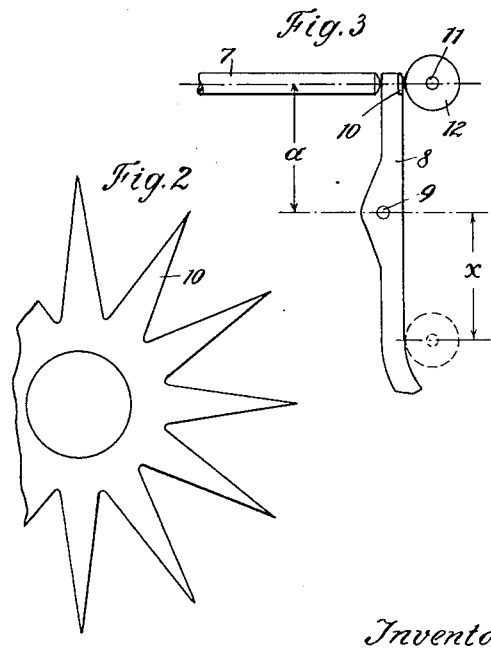
Inventor:
Otto Schaper
Marks & Clerk
Attorneys.

Patented Jan. 12, 1937

2,067,685

UNITED STATES PATENT OFFICE 2,067,685

SERIES CLUTCH MECHANISM FOR MOTOR VEHICLES

Otto Schaper, Berlin-Schlachtensee, Germany

Application April 27, 1934, Serial No. 722,793
In Germany April 28, 1933

3 Claims. (Cl. 192—48)

The object of the invention is, to further simplify the operation of motor vehicles. The invention relates to the so-called "two lever car", which is provided with only one acceleration pedal for adjusting the desired speed and with one brake pedal. As it has hitherto not been possible to generally introduce the stepless transmission, it appears advisable to further develop the spur wheel gearing which has given satisfaction in many years service.

In gear transmissions having shiftable gears or shiftable coupling sleeves, the changing over from one speed to another without shocks presents difficulties because the parts to be brought into engagement at first rotate at different speeds. The invention hereinafter described is therefore based on the idea of providing a separate clutch for each speed. The friction clutch allows a slipping during the changing and thus engages the following speed without shock. The invention thus offers a solution of the problem to be solved and appears important for the development of the motor vehicle.

The invention is illustrated by way of example in the accompanying drawing in which:—

Fig. 1 shows the clutch mechanism in longitudinal section.

Fig. 2 shows in elevation part of one of the star-shaped springs.

Fig. 3 is a part elevation of the clutch controlling mechanism.

A drum 1 keyed on or integral with the driving shaft rotates a clutch ring 3 by means of a key and groove 2. The clutch ring 3 is conical on its inner side, the angle of the cone being great. The clutch ring 3 surrounds the outer conical head 4 of the slide sleeve 4, 5, 6 provided with a plurality of slits. The slide sleeve 4, 5, 6 has several slits in the head 4 and in an adjoining drum-shaped portion up to the plane transition portion 5, so that the head 4 can be compressed by slipping on the clutch ring 3 like a vice.

The slide sleeve 4, 5, 6 terminates in a hub part having a grooved flange 6.

Several bars 7 distributed around the circumference of the clutch ring 3 press against this ring, the free ends of these bars bearing against two-armed levers 8. These levers are hingedly mounted on the slide sleeve 4, 5, 6 by means of axles 9.

The shape of the lever 8 is shown in Fig. 3 and its manner of operation will be hereinafter described.

In Fig. 1 a spring 10 loads the levers 8. The spring 10 is, according to Fig. 2, of star-shape so that each arm forms a triangular spring of constant strength.

Fig. 1 shows that the spring 10 is fixed in the inner side on the hub of the slide sleeve 4, 5, 6. The levers 8 are also loaded by rollers rotatably mounted on the ends of the arms of a spring 11. This spring 11 is star-shaped like the spring 10.

The spring 11 is fixed on a hub 13 which is mounted on the hub of the slide sleeve 4, 5, 6. A grooved sleeve 14 has two pins engaging through helical slots in the hub 13 and also in the axially parallel slots in the slide sleeve 4, 5, 6. An axial displacement of the sleeve 14 therefore rotates the spring 11 relatively to the slide sleeve 4, 5, 6 and, according to Fig. 3, allows the rollers 12 to roll on the levers 8. It will be noted that the springs 10 and 11 press the lever 8 in the same direction in the position shown in full lines in Fig. 3. However, after the roller 12 has passed the pivotal point 9 of the lever 8 the spring 11 will tend to oppose the action of the spring 10, and at a certain point will overcome said action thus uncoupling the clutch.

According to Fig. 1 the head 4 of the slide sleeve 4, 5, 6 carries a hardened spring band 15 in a corresponding groove. This spring band 15 has one slit in its circumference to enable it to be narrowed slightly with the head and serves for covering the inner side of the slits in the head 4 as the slit in 15 does not register with any of the slits in head 4.

The main gear shaft 20 is journalled in a central projection of the drum 1.

A clutch disc 16 is keyed on one end of the main gear shaft 20, whereas a Cardan joint not shown in the drawing is mounted on the other end of the shaft. A tube shaft 21 with a clutch disc 17, a tube shaft 22 with a clutch disc 18 and a tube shaft 23 with a clutch disc 19 are arranged concentrically to the main gear shaft 20.

On the free end of the shafts 21, 22, 23 toothed wheels, not shown in the drawing, are mounted and establish in known manner different ratios of transmission between the engine and the Cardan shaft through the intermediary of a counter-shaft.

The connection between the drum 1 and the clutch disc 18 is effected in the position shown in Fig. 1 in that the arms of the springs 10 and 11 arranged in pairs one over the other press the clutch ring 3 against the head 4 through the intermediary of the rods 7, so that this head is compressed and presses the spring band 15 against the rim of the clutch disc 18. The drum 1 then rotates the clutch disc 18 by friction.

For disconnecting the clutch the rotating sleeve 14 is axially shifted in known manner by means of a fork, so that the rollers 12 are moved relative to the levers 8. Fig. 3 shows in dotted position the roller 12 in disengaged position, whereas, when the roller 12 is in the position shown in full lines, the two springs 10 and 11 act with full force on the rods 7 and thus close the clutch.

The declutched position is theoretically reached as soon as no force is exerted on the rods 7. However, in practice it is necessary to produce a slight clearance between the parts to be declutched in order to prevent binding owing to oil and elastic enlargement of the clutch disc. The following signs are given for the explanations hereinafter set forth:

$P$ = spring force (kg.).
$f$ = bending of the spring, measured from the expanded shape to the actual shape (cm.).
$c$ = spring constant (cm./kg.).
$A$ = deformation work (cmkg.).
$Index_{10}$ = relating to spring 10.
$Index_{11}$ = relating to spring 11.

According to Fig. 3 $a$ designates the distance between the rods 7 and the coordinate axles 9 of the levers 8. The actual distance between the rollers 12 and the axle 9, but designated as positive on the opposite side of the lever 8, is represented by $x$.

The present invention allows a force displacement from the clutched condition up to the declutching with any desired end clearance, without theoretically requiring an expenditure of work. In practice only the slight frictional resistances have consequently to be overcome. In Fig. 3 the clutch is free from forces as soon as (Equation 1) $\quad P \times x = P \times a$.

Up to this value of $x$ the lever 8 extends straight crossing the axle at right angles. As the lever 8 does not move until this state of equilibrium is reached, the tensions of the springs 10 and 11 remain unchanged.

No expenditure of force will then be necessary for the further movement of the roller 12 when the total of the work accumulated in the springs 10 and 11 remains unchanged. As the clearance $x$ increases the lever 8 commences to turn about its axle 9 so that the spring forces $P_{10}$ and $P_{11}$ become variable. The Equation (1) must be maintained. The new second condition results from:

$$f = c \times P$$
$$dA = P \times df = \frac{1}{c} \times f \times df$$
$$A = \frac{1}{2c} \times f^2$$

As work is neither imparted nor taken $$\Delta A = 0 = \Delta A_{10} + \Delta A_{11}$$
$$\Delta A = \frac{1}{2c_{10}} \times \Delta(f_{10}^2)$$
$$A = -\frac{1}{2x} \times (f)$$

(Equation 2) $\quad \frac{1}{2c_{10}} \times \Delta(f_{10}^2) = \frac{1}{2c_{11}} \times \Delta(f_{11}^2)$ Equation 1 can also be written as (Equation 3) $\quad \frac{f_{10}}{c_{10}} \times a = \frac{f_{11}}{c_{11}} \times x$ There is a coordinate $\Delta f_{10}$ for every desired clearance between the spring band 15 and the clutch discs 16, 17, 18, 19. From this according to Equation 2 $f_{11}$ and then according to Equation 3 the value of $x$ can be calculated. Thus the shape of the lever 8 is determined.

A clearance of 0.3 to 0.4 mm. is sufficient for designing a clutch and this corresponds to a movement of the rod 7 of from 1.5 to 2 mms. The end of the lever 8 can then be constructed with sufficient accuracy as an arc, which extends tangentially from the straight portion.

The slide sleeve 4, 5, 6 can be axially shifted while in declutched position by a fork engaging in the groove of the hub 6 in such a manner that the spring band 15 is opposite one of the clutch discs 16, 17, 18, 19. The engine shaft can therefore be coupled as desired with one of the shafts 20, 21, 22, 23.

The number of clutch discs arranged in a row has been assumed to be four in the accompanying drawing, but any desired number of discs may be employed.

The travelling conditions for fully exploiting the engine require that the changing from one speed to another can take place when the engine is running at different speeds. The maximum value is determined in the condition of acceleration by the permissible speed of the engine after attaining which the next higher speed must be engaged. This manner of travelling produces the best utilization of the engine output for accelerating the vehicle and mounting gradients.

The lower limit for changing is attained when the vehicle is retarded at full speed by road conditions to such an extent, that the running speed of the engine is outside the range of the necessary uniformity. This manner of travelling produces on account of remaining as long as possible in the direct speed, the quietest running of the vehicle and is therefore best suited for town travelling.

The gear changing can take place within the above mentioned limits in dependency upon the running speed of the engine.

I claim:—

1. In a change speed device, a driving shaft, a main gear shaft in alignment therewith and pivoted therein, concentric hollow shafts successively supported on the main gear shaft and succeeding hollow shafts, a series of clutch disks the members of which are secured successively to said main gear shaft and said hollow shafts, a drum on the driving shaft surrounding said clutch disks, an outer clutch ring slidably connected to the inner circumference of said drum and having a conical inner surface, an inner slit clutch ring having an outer conical surface coacting with the conical surface of the outer clutch ring, means for moving the inner and outer clutch rings together longitudinally of the shaft and means for moving the outer clutch ring relative to the inner clutch ring.

2. The device as claimed in claim 1 in which the means for moving the clutch rings together comprises a slide sleeve mounted slidably on the outer hollow shaft and having two sections of different diameter and a plate connecting said sections, said plate being connected to the inner clutch ring by a slotted drum.

3. The device as claimed in claim 1 in which the means for moving the clutch rings together comprises a slide sleeve mounted slidably on the outer hollow shaft and having two sections of different diameter and a plate connecting said sections, said plate being connected to the inner clutch ring by a slotted drum, and the means for moving the outer clutch ring relatively to the inner clutch ring comprises a series of cam levers pivoted on said plate, a spring star wheel mounted on said slidable sleeve adjacent said plate, a second slidable sleeve mounted on the first slidable sleeve and movable longitudinally thereof, a second spring star wheel mounted on said second slidable sleeve, rollers mounted on the extremities of said second spring star wheel bearing against the levers respectively, rods extending from the outer clutch ring and bearing against one end of said levers, a slidable grooved ring surrounding said second sleeve, pins extending from said grooved ring through helical slots in the second sleeve and axially extending slots in the first sleeve whereby on longitudinal motion of the grooved ring the rollers move along the length of the levers and move the outer clutch ring into engagement with the inner clutch ring or permit it to disengage therefrom.

OTTO SCHAPER.